March 31, 1959  F. L. LE BUS, SR  2,879,849
RELEASABLE FISHING APPARATUS
Filed Feb. 11, 1955  5 Sheets-Sheet 1

INVENTOR
F.L. Le Bus, Sr.
BY P. M. McKnight
ATTORNEY

March 31, 1959  F. L. LE BUS, SR  2,879,849
RELEASABLE FISHING APPARATUS
Filed Feb. 11, 1955  5 Sheets-Sheet 3

INVENTOR
F. L. Le Bus, Sr.
BY C. M. McKnight
ATTORNEY

March 31, 1959 F. L. LE BUS, SR 2,879,849
RELEASABLE FISHING APPARATUS
Filed Feb. 11, 1955 5 Sheets-Sheet 4

INVENTOR.
F. L. Le Bus, Sr.
BY
ATTORNEY

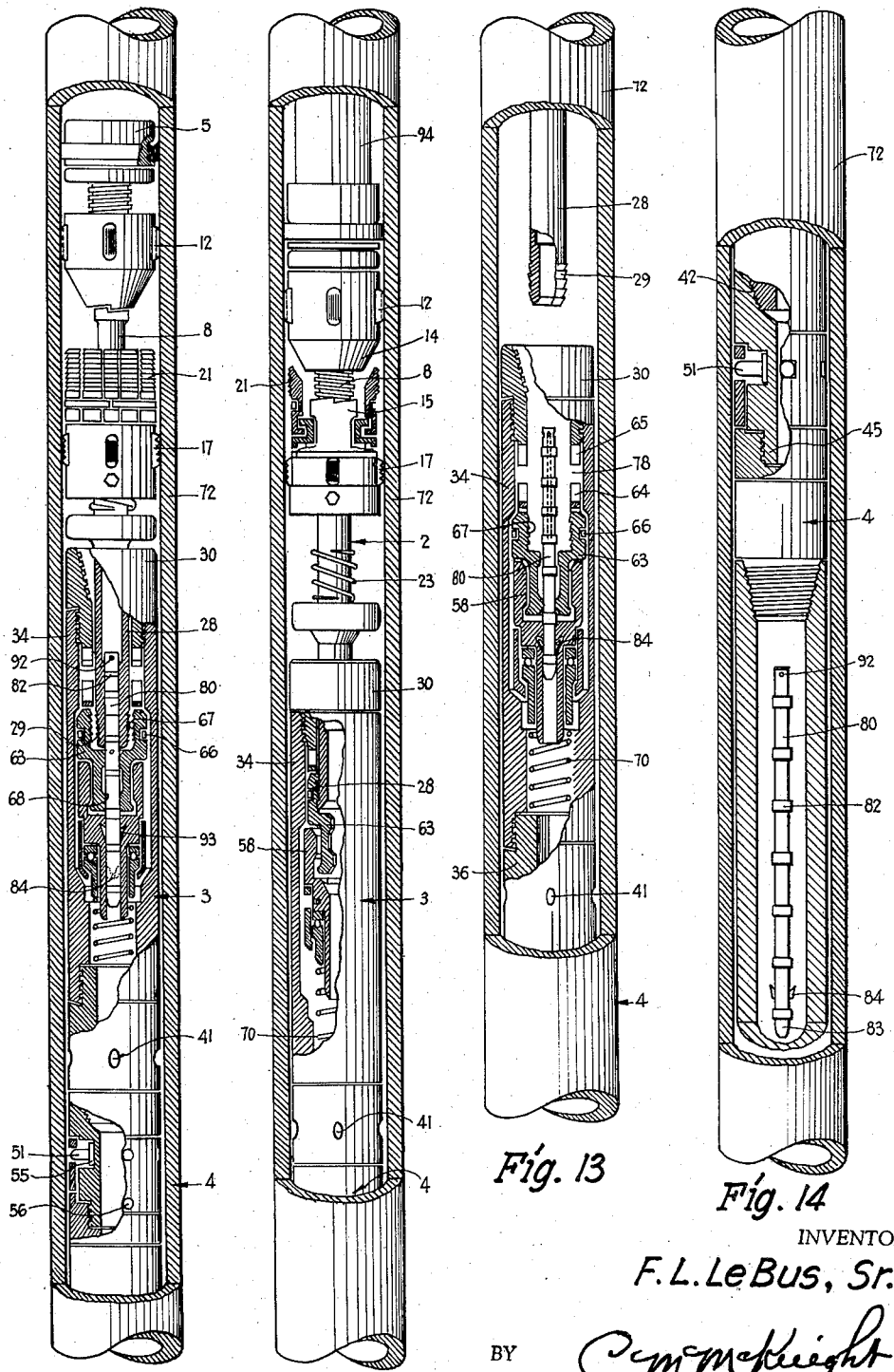

United States Patent Office 2,879,849
Patented Mar. 31, 1959

2,879,849
RELEASABLE FISHING APPARATUS

Franklin L. Le Bus, Sr., Longview, Tex., assignor to Wash Overshot & Spear Engineers, Inc., a corporation of Texas Application February 11, 1955, Serial No. 487,682

14 Claims. (Cl. 166—103)

This invention relates to improvements in fishing tools for oil wells and more particularly, but not by way of limitation, to an improved drill collar pulling apparatus such as disclosed in applicant's co-pending applications, No. 393,711, now Patent No. 2,804,151 filed November 23, 1953, No. 405,186 filed January 20, 1954, and No. 463,554 filed October 20, 1954. In addition, the present apparatus could be utilized in applicant's co-pending method application, Serial No. 341,979, now Patent No. 2,817,555 filed March 12, 1953, and entitled "Method and System of Retrieving Stuck Pipe Joints in Well Bores."

In the present day rotary drilling of oil wells, a drilling string comprising a plurality of drilling pipe sections secured in tandem relation is disposed in the well bore. The lower portion of the drilling string is usually provided with a varying number of drill collars having a drill bit on the lower end thereof for drilling the subsurface formation upon rotation of the drilling string. The drilling string is secured at the surface of the well to a kelly and rotary table causing rotation of the string in the well bore.

Drill collars utilized in rotary drilling are usually heavy, rigid tubular members which are difficult to flex or bend and in drilling in certain formations, such as hard chert or limestone or what is commonly called tilted geological formations, the drill bit may be deflected from its true vertical course in the well bore and caused to drill a crooked bore. In such an operation, the rigid drill collars will rub against the side of the well bore and form an off-set recessed portion, commonly called a "key seat." In deeper wells, the bore will usually contain several of these off-set key seat portions and when it is necessary to remove the drill bit from the bore, the bit will usually become lodged in one of these key seats since they are of smaller diameter than the well bore proper and the over-all diameter of the drill bit. It then becomes necessary to disconnect and remove a substantial portion of the drill pipe and collars from the well bore, leaving the stuck drill bit and a few (usually two or more) drill collars in the well bore. In order to free the stuck collars and bit, a wash-over string having a reaming tool on the lower end thereof is run into the well bore, and reams around the key seat and stuck pipe in order to free the drill bit. In most present day apparatuses, when this is done the stuck drill bit and collars upon being loosened will fall to the bottom of the well bore, sometimes causing serious damage to the bit and also necessitating running another set of fishing tools into the bore for removing the loosened collars and bit.

The present invention contemplates a novel fishing tool apparatus adapted to release and remove lodged drill bit and collars in one trip of the fishing tool into the well bore without causing damage to the bit or the collars. The retrieving or fishing apparatus is carried in the wash-over string and engages the uppermost drill collar prior to the wash-over pipe being telescoped over the drill collars for the reaming operation. A reaming shoe on the lower end of the wash-over pipe is provided for freeing the lodged bit and collars and substantially simultaneously with the loosening thereof, the drill collars and bit are prevented from dropping to the bottom of the well bore by an automatic engagement of the retrieving apparatus with the wash-over pipe, so that they may be subsequently removed from the well bore. Furthermore, in lowering the fishing apparatus into the well bore with the wash-over string, the reaming shoe is maintained above the leading edge of the drill collar engaging portion of the fishing tool disposed in the wash string to insure that there is a connection between the fishing apparatus and the lodged drill collar prior to the reaming operation.

In applicant's prior applications, release of the retrieving unit was obtained hydraulically as is preferably utilized in deeper well bores where a greater number of drill collars may be lodged in the formation. The present invention is distinguished from the prior application No. 393,711 relating mainly to a mechanical operation in that the present invention has two means of releasing, as well as substantially the same automatic means of reconnecting. Furthermore, it may be used more advantageously where a lesser number of drill collars are utilized in the drilling string, such as in the rotary drilling of shallower formations. The present invention is similar to the prior applications in that after the drill collars are loosened and it is still difficult to remove them with the wash-over string, the loosened drill collars may then be lowered to the bottom of the well bore and the fishing or retrieving apparatus may be separated to permit insertion of an independent fishing apparatus.

It is an important object of this invention to provide a fishing tool apparatus for loosening lodged drill collars in an oil well bore which provides a reaming action while simultaneously precluding a substantial downward movement of the drill collars upon being dislodged by the reaming action.

And still another object of this invention is to provide a fishing tool apparatus for dislodging and recovering stuck drill collars in a well bore by one operation of running the tools in the well bore.

And still another object of this invention is to provide a drill collar retrieving mechanism supported in a wash-over string for engagement with stuck drill collars in a well bore and which may be mechanically disconnected therefrom to permit removal of the retrieving mechanism with the wash-over string.

And still another object of this invention is to provide a drill collar retrieving apparatus supported in a wash-over pipe which may be engaged and disengaged with the lodged drill collars automatically without additional tools utilized for this purpose.

An additional object of this invention is to provide a drill collar fishing tool apparatus supported in a wash-over string for reaming around stuck drill collars in a well bore where the fishing tool will engage the drill collars prior to a reaming action of the wash-over string, thereby preventing possibility of premature loosening of the drill collar before engagement with the retrieving apparatus.

And still another object of this invention is to provide a fishing tool apparatus supported in a wash-over reaming string for loosening stuck drill collars in a well bore which assures release of the wash-over string after engagement of the fishing tool with the stuck drill collars either mechanically or by hydraulic operation.

And still another object of this invention is to provide a fishing tool apparatus supported in a wash-over string for engaging and holding stuck drill collars that are loosened by the wash-over string which provides positive engagement of the fishing tool with the stuck collars yet affords easy coupling and uncoupling of the fishing tool apparatus from the stuck drill collars when it is desired to do so and thereby providing a simple and economical tool that has sufficient flexibility for variable types of operations.

Other objects and advantages of the invention will be evident from the following detailed description, read in conjunction with the accompanying drawings, which illustrate may invention.

In the drawings:

Figures 12, 13 and 14 are views similar to Fig. 8 showing application of a special tool for releasing and re-engaging various units of the fishing tool disposed in the wash-over string.

Figure 15 is a view similar to Fig. 8 showing a special operation of the fishing tool.

Figure 1:
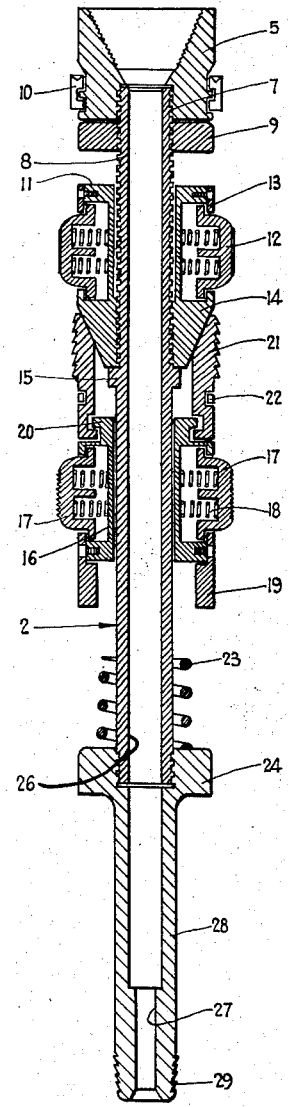
Figure 1 is a sectional elevational view of the upper portion of the drill collar fishing mechanism shown in exploded dissembly for purposes of clarity.
Figure 2:
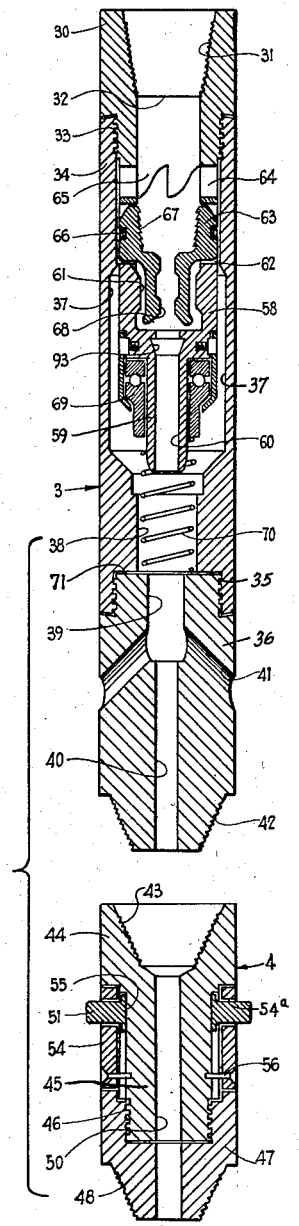
Figure 2 is a similar view showing the lower portion thereof.

Referring to the drawings in detail and particularly Figs. 1 and 2, it will be apparent that the drill collar retrieving or fishing tool is generally indicated at 1 and comprises three main units wherein the upper portion according to Figs. 1 and 2 discloses a casing spear unit 2, the middle portion an overshot unit 3, and the extreme lowermost portion a jointing tool body 4. Referring to Figs. 1 and 2, the upper casing spear unit 2 comprises a spear head 5 having a tapered threaded aperture 6 for a purpose as will be hereinafter set forth. The head 5 is threadedly connected at 7 to a tubular spear body 8 and held in the uppermost portion thereof by a lock nut 9. A suitable circular packer member 10 is disposed around the head 5. Threaded on the tubular body 8 is a mandrel body 11 carrying a plurality of circumferentially disposed spring urged friction dogs 12 held therein by a spring assembly ring 13. The lower portion of the body 11 is tapered to provide a slip mandrel 14 for a purpose as will be hereinafter set forth. As is depicted in Fig. 1, immediately below the lower end of the slip mandrel 14, the tubular body 8 is provided with a circular shoulder 15 for a purpose as will be hereinafter set forth. Below the shoulder 15 and slidable upon the tubular body 8 is a lower mandrel body 16 carrying a plurality of friction dogs 17 urged outwardly by suitable springs 18 and maintained in assembly by a ring 19. The upper portion of the body 16 is provided with shoulders 20 for connection with a plurality of circumferentially disposed serrated slips 21 held in connecting relation with the body 16 by a spring ring 22. A bumper spring 23 is disposed on the tubular body 8 below the ring 19 and is anchored at its lowermost portion against a spear swivel coupling 24 threadedly engaged at 25 with the lower end of the sleeve 8. The swivel coupling 24 is tubular and is provided with a major bore 26 communicating with a minor bore 27 for a purpose as will be hereinafter set forth. Swivel coupling 24 is reduced in diameter providing a lower tubular extension 28 having left hand wickers 29.

The overshot unit 3 depicted in detail in the upper portion of Fig. 2 comprises a swivel body head 30 having a tapered threaded aperture 31 communicating with a central bore 32. The head 30 is threaded at 33 to an overshot swivel body 34 which extends downwardly into threaded connection at 35 with a circulating body 36 disposed below body 34. The body 34 is provided with an increased diameter bore portion 37 communicating with a smaller diameter bore 38 which in turn communicates with a still smaller diametered bore 39 provided in the upper portion of the circulating body 36. The central bore 39 in turn communicates with a smaller bore 40, and diverging lateral opening bores 41 for a purpose as will be hereinafter set forth.

Figure 3:
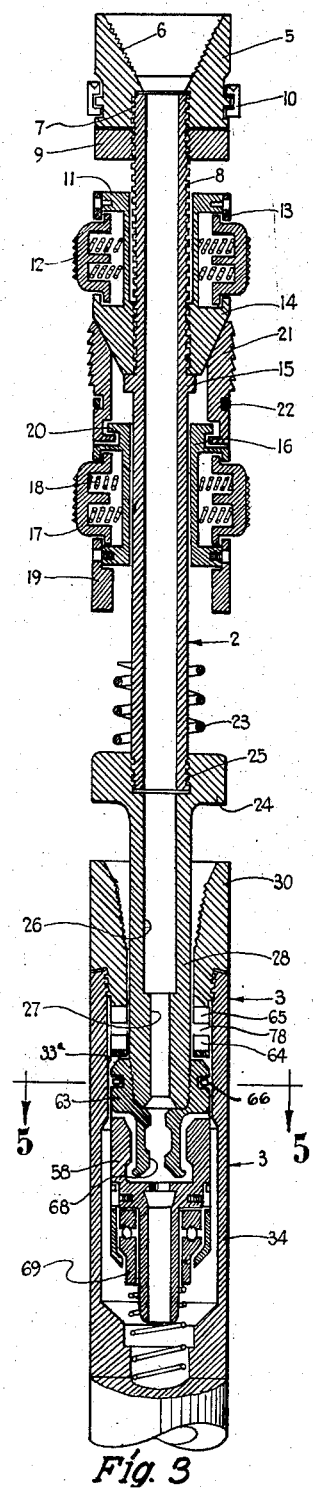
Figure 3 is a similar view of the upper portion of the apparatus in assembly.
Figure 3A:
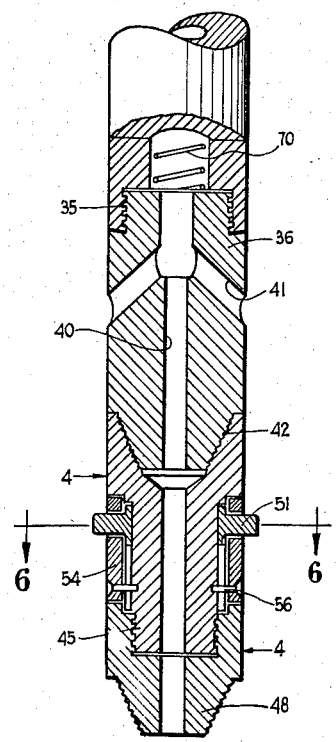
Figure 3A is an extension of the assembled apparatus in Fig. 3.
Figures 4, 5, 8, 9:
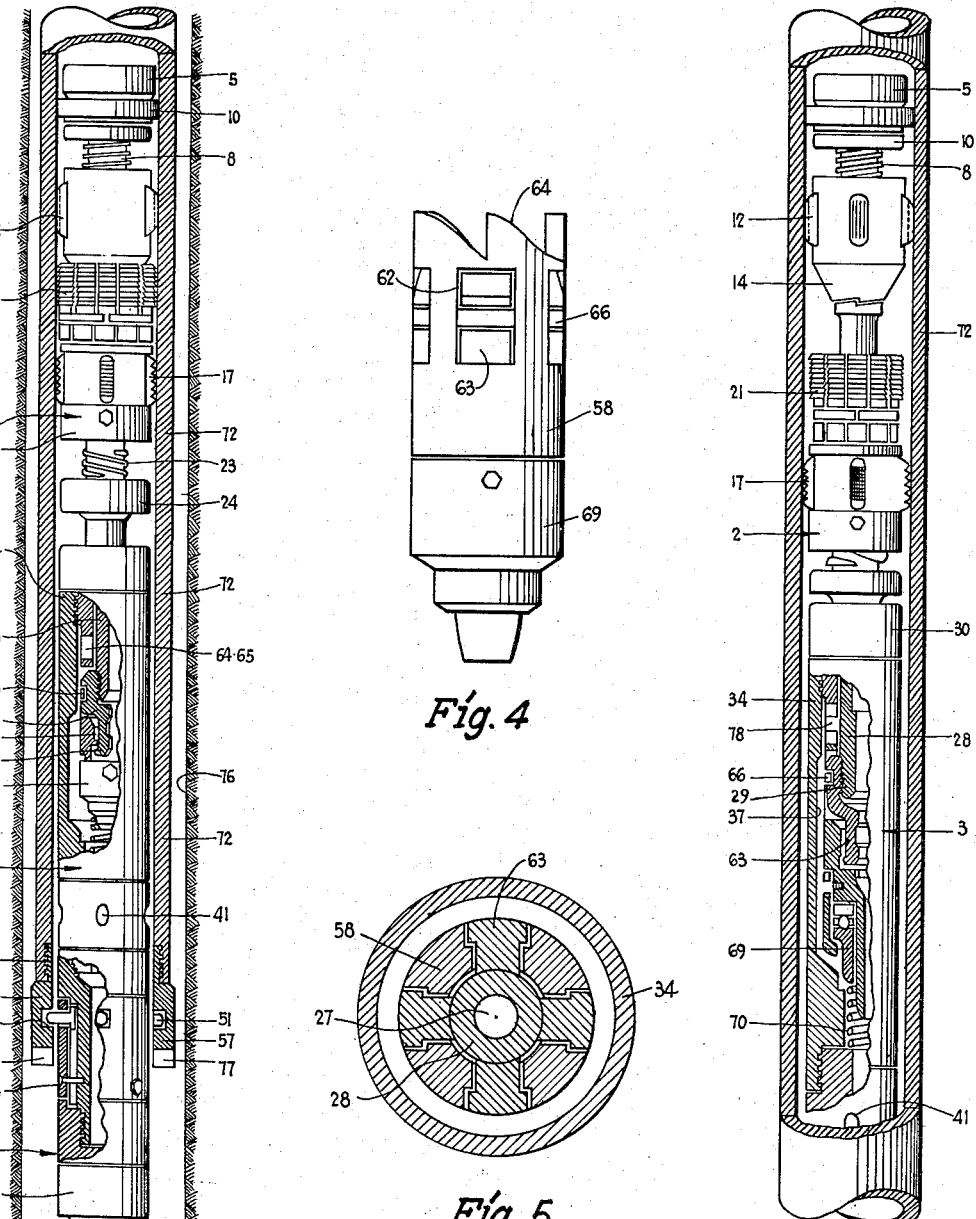
Figure 4 is a detail view elevation of the overshot coupling lug retaining body.
Figure 5 is a sectional view taken on lines 5—5 of Fig. 3.
Figure 8 is a sectional elevational view of the wash-over string disposed in a bore hole prior to a reaming operation with the stuck drill collars, and showing the fishing tool mostly in elevation, but having certain parts in section for clarity.
Figure 9 is a view similar to Fig. 8 showing the fishing tool engaged as at the start of the reaming operation around the stuck drill collars.
Figure 10:
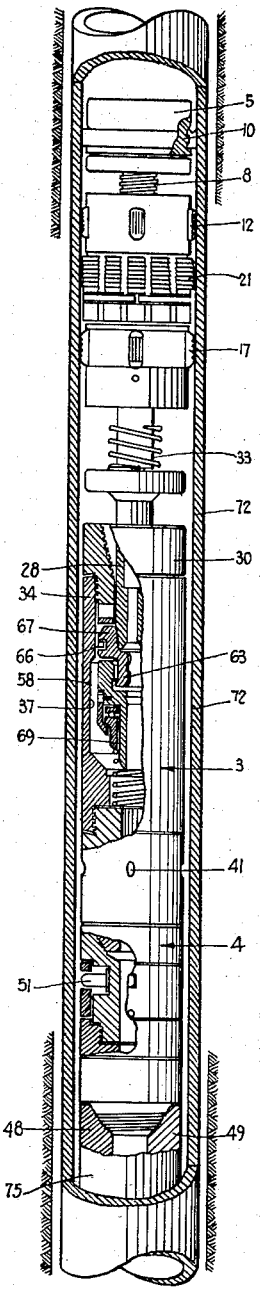
Figure 10 is a view similar to Fig. 8 showing the operation of the fishing tool upon loosening of the stuck drill collar.
Figure 6:
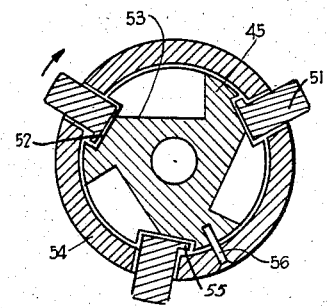
Figure 6 is a view taken on lines 6—6 of Fig. 3A showing the outer position of the reamer shoe holding lugs.
Figure 7:
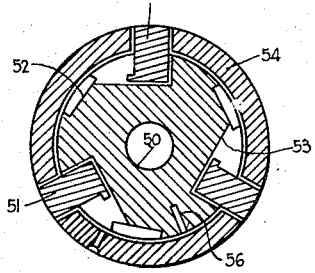
Figure 7 is a view similar to Fig. 6 showing the inner receding position of the shoe retaining lugs.
Figure 11:
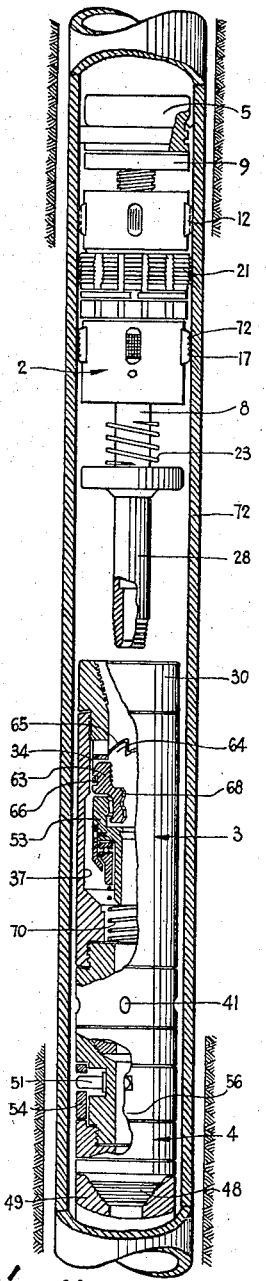
Figure 11 is a view similar to Fig. 8 showing a position of release for the fishing tool.

The lower end of the overshot unit 3 is provided with a tapered pin member 42 for threaded connection with a threaded box member 43 of the jointing tool unit 4. The jointing tool unit comprises a body member 44 having a longitudinal extension 45 of reduced diameter and threaded at 46 to a lower body portion 47, which in turn is provided with a threaded pin portion 48 for connection with a female box 49 of a stuck drill collar as shown in Figs. 8, 10 and 11. The extension body 45 is provided with a circulating bore 50 extending through the lower body 47. The jointing tool body 44 is adapted to carry a plurality of circumferentially spaced (preferably three, but not limited thereto) holding dogs 51 as clearly shown in Figs. 2, 3A, 6 and 7. The outer periphery of the reduced body or sleeve 45 is provided with a plurality of cut-away portions or longitudinal grooves 52 communicating with deeper groove portions 53 (Figs. 6 and 7). In assembly, the holding dogs 51 are maintained by an outer retaining sleeve or collar 54 abutting rear shoulder portions 55 of each pin 51. The sleeve 54 has spaced apertures 54ª permitting extension of the pins 51 therethrough. The pins 51 are disposed in alignment with the slots 52 by bronze retaining pins 56 which are shearable in a manner hereinafter set forth. The collar 54 is held in assembled relation around the body 45 by the lower portion 47 as is clearly shown in Figs. 2 and 3A. The holding dogs 51 limit the downward movement of the reaming shoe 57 as is clearly shown in Fig. 8 for a purpose to be hereinafter set forth.

In Fig. 4 is shown a swivel coupling lug body 58 (shown in section in Figs. 2 and 3) which is provided with a reduced sleeve or lower extension 59 having a bore 60. The upper portion of the swivel body 58 is provided with a communicating bore 61 of greater diameter than the bore 60, and also with a plurality of circumferentially spaced apertures 62 for holding the sets (preferably four, but not limited thereto) of coupling lugs or dogs 63 disposed therein. The upper portion of the body 58 is provided with clutch teeth 64 adapted to cooperate with the clutch teeth 65 on the lower portion of the swivel body portion 30 for a purpose as will be hereinafter set forth. The sets of coupling lugs 63 are held in the apertures 62 by a spring assembly ring 66 disposed in suitable grooves in the lug body 63. The coupling lugs 63 are of substantially angled configuration as clearly shown in Fig. 2 providing upper and lower leg portions. The inner periphery of the upper legs are provided with a plurality of left hand wickers 67 while the lower leg portions each have an inwardly directed tapered shoulder portion 68 disposed in the bore 61 for a purpose as will be hereinafter set forth. An anti-friction bearing assembly unit 69 is disposed around the sleeve 59 and provides an anchor for the upper end of an overshot actuating spring 70 disposed in the bore 38 of the overshot swivel body 34. The opposite end of the spring 70 is anchored against the top 71 of the overshot circulating body 36.

In Figs. 1 and 2 the spear unit 2, overshot unit 3 and jointing tool unit 4 are depicted in dissembly for purposes of clarity relative to the separate structural elements thereof. These units are shown in assembled relation in Fig. 3 prior to being disposed in a washover pipe of a wash-over string as is shown in Fig. 8. In Fig. 8 the assembled fishing tool 1 comprising the units 2, 3 and 4 is disposed in a wash-over pipe 72 having a reaming shoe 57 threadedly connected at 73 to the lower end thereof. The reaming shoe is provided with a plurality of circumferentially spaced grooves or recesses 74 (preferably three) for the reception of the holding lugs 51 therein and preclude downward movement of the wash-over pipe 72 below the vertical position of the holding lugs 51 until there is a make-up connection between the pin 48 of the jointing tool body 47 with the box 49 of the stuck drill collars 75. In this manner, with the retrieving unit 1 disposed in the wash-over string or pipe 72, it is assured that there will be no reaming action by the shoe 57 prior to a positive engagement of the unit 1 with the stuck drill collars 75. As the wash-over pipe 72 is lowered in the well bore on the operating string (not shown) right hand rotation thereof will engage the pin 48 of unit 4 in the box 49, while maintaining the shoe 57 above the lodged drill collars 75. During this operation, the unit 1 is supported in the wash-over pipe 72 by the engagement of the spear slips 21, upper friction dogs 12 and lower friction dogs 17 with the inner periphery of the wash-over pipe 72. As soon as the jointing tool pin 48 is engaged with the box 49 of the stuck collar 75, continued rotation and simultaneous longitudinal vertical movement of the wash-over pipe 72 will cause a shearing of the pins 56 (Figs. 1, 2 and 6) permitting slight rotative clockwise movement (Fig. 6) of the sleeve 45 thereby bringing the deeper grooves 53 into alignment with the shoulders 55 of the holding dogs 51 which are caused to be moved inwardly by the reaming shoe 57, thereby permitting downward movement of the reaming shoe 57, and the wash-over pipe 72 adjacent the stuck drill collar for a reaming action as clearly shown in Fig. 10.

From Fig. 8 it will be noted that the packing ring 10 directs circulation of the drilling fluid through the tubular body 8, apertures 26, 27, bores 32, 61, 60, 38, 39, through lateral ports 41 and downwardly through central bores 40 and 50 for forcing circulating fluid around the jointing tool body 47, the stuck drill collars 75 and the cutting teeth 77 of the reaming shoe 57, thereby removing formation cuttings through the annulus 76 between the wash-over pipe 72 and the well bore wall to the surface of the well. It will be apparent that during the lowering of the wash-over pipe 72 and fishing tool unit 1 prior to engagement with the stuck collars 75, that the coupling lugs 63 will maintain the coupling spear unit 2 and the overshot unit 3 in engaged relation through connection of the wicker teeth 29 and 67. The swivel coupling lug body 58 is disposed in the overshot swivel body 34 in this operation and after engagement of the unit 4 with the stuck drill collars 75 a continued downward movement of the wash-over pipe 72 and reaming shoe 57 for the reaming operation will cause the slips 21 shown engaged in Fig. 8 to be disengaged as shown in Fig. 9 due to downward movement of the casing spear unit 2. It will be apparent with the connection between the pin and box 48—49 that the jointing tool body 44 and lower overshot body 36 and the overshot swivel body 34 are stationary with the stuck drill collar 75.

As the wash-over pipe moves downwardly, the engaged lower dogs 17 connecting with the slips 21 (Figs. 3 and 3A) will move the slips downwardly out of engagement with the tapered mandrel 14, thereby providing a non-engaging disposition of the slips 21 as shown in Fig. 9. In this arrangement the upper dogs 12 engaging with the inner periphery of the wash-over pipe 72 simultaneously move the spear unit 2 with the wash-over pipe 72 to cause a non-clutching or disengagement of the teeth 64 on the swivel lug body 58 and the teeth 65 on the overshot swivel body 30, all against the action of the spring 70 (Figs. 2, 3 and 9) thereby permitting rotative movement of the spear unit 2 and the connecting swivel lug retaining body 58 with the rotation of the wash-over pipe 72. The remaining parts of the overshot unit 3 and the jointing tool unit 4 as heretofore stated are stationary due to the engagement with the stuck drill collars.

The swivel lug body 58 and the holding lugs 63 disposed on the anti-friction bearing assembly unit 69 are rotated simultaneously during the reaming and wash-over operation. Thus, the lugs 63, although holding the units 2 and 3 in connected relationship, are permitted to swivel, or rotate simultaneous with the wash-over pipe 72. The reduced portion 28 of the casing spear coupling 24 as clearly shown in Fig. 9 has the wickers 29 connected with the lug wickers 67 (Fig. 2) and when disposed in the annulus or increased bore 37 of the body 34 provide a positive connection with the spear unit 2 for simultaneous rotation with the wash-over pipe 72 during the reaming operation. During this reaming operation, the slips 21 are in disengaged position as shown in Fig. 9 due to the downward movement of the body portion 16. The slips 21 are maintained in a disengaging position because of the simultaneous rotation of the spear unit 2 with the downwardly rotating wash-over pipe 72 during the wash-over operation, thereby maintaining the slips 21 away from the tapered mandrel 14.

As is clearly shown in Fig. 9, a clearance space 78 is provided between the upper clutch teeth 65 and the lower clutch teeth 64 during the reaming operation. This clearance may be anything from a quarter of an inch (¼") minimum up to twelve inches (12") depending upon the movement downward of the coupling lug body 58 against the action of the spring 70, and this clearance permits a raising of the reaming shoe 57 during the reaming operation. It sometimes becomes necessary to raise the reaming shoe 57 because the cutting teeth may stick, or hang up in hard, or gummy formations and make rotation of the shoe difficult. The clearance space 78 provides for free movement of the wash-over pipe 72 and the shoe 57 so that the shoe may be again rotated freely, thereby providing for a continued reaming operation. If the right hand rotation of a stuck reaming shoe in this condition should cause an accidental or intended release of the swivel coupling lugs 63 and the spear swivel coupling 28 and the connected left hand wickers, all that is necessary for automatic re-engagement is to set the wash-over pipe 72 and its connecting spear unit 2 back to its lowest point for re-connection of the anchors such as shown in Fig. 9. The bore 37 in the coupling lug body 34 is of increased diameter with respect to an upper bore 33a so that the coupling lugs 63 will have sufficient space or clearance so that they can automatically spread outwardly against the spring tension of the retaining ring 66. This permits the left hand wickers 29 of the spear unit 2 to re-enter or re-engage the wickered portion of the coupling lug 63 so that such re-connection or re-engagement may be accomplished without either a right or left hand rotation of the unit. It is to be understood, however, that this re-connection can be made during rotation of the apparatus. The re-connection may be made as long as the wash-over pipe 72 is moving downward and which holds the tubular extension 28 at its lowest position, or in a position for re-connection with the lugs 63. A right hand rotation of the unit during such re-connection will not cause the left hand wickers to unthread from the coupling lug retaining body 58 while in such downward position and against the roller bearing assembly 69 because of the simultaneous rotation thereof with the wash-over pipe 72 and its supported spear assembly 2. Upon re-connection of the wickers 29 and 67, the spring 66 forces the coupling lug 63 into an engaged position as clearly shown in Fig. 9 even during rotation of the unit after which the normal reaming operation may be continued such as shown in Figs. 8 and 9.

As clearly shown in Fig. 10, the reaming shoe 57 has moved downward to ream away the key seat portion of the well bore, and thereby loosen the stuck drill collars which cause the loosened drill collars to begin initial movement in a downward vertical direction toward the bottom of the well bore. In this initial movement, the slip mandrel 14 is caused to move downward due to the chain of connection with the jointing tool unit 4, overshot unit 3 and the sleeve 8 connected with the mandrel 14 when the wickers 29 are engaging with the wickers 67. The lower friction dogs 17 engaging the wash-over pipe 72 will not permit the slips 21 to move downward with the loosened drill collars 75, consequently as the slip mandrel 14 is caused to be moved downwardly, and the tapered portions of the mandrel 14 will move the slips 21 radially outward into engagement with the inner periphery of the wash pipe 72 thereby catching or holding the stuck drill collars substantially simultaneous as they are loosened by the reaming operation. Engagement of the slips 21 in this procedure precludes any further downward movement of the spear unit 2, and the connecting overshot unit 3 and drill collars 75. As shown in Fig. 10, when the slips 21 are engaged, the coupling lugs 63 are disposed in the body 34 above the enlarged bore portion 37 thereby precluding expansion of the lugs 63 and a release from the swivel coupling sleeve 28 therefrom. Alluding further to the sequence of the catching operation of the loosened drill collars, it becomes apparent that the wash pipe is held by the upper drilling string (not shown) and initial downward movement of the loosened drill collars 75 moves the mandrel 14 downward because of the chain of connection between the spear unit 2, overshot unit 3 and jointing tool unit 4 moving the slips outwardly into biting engagement with the inner periphery of the wash-over pipe 72 and precluding further downward movement of the loosened collars.

During the reaming operation it may become necessary to uncouple or release the casing spear unit 2 from the overshot unit 3 so that the spear unit 2 may be raised with the wash-over pipe unit 72 and leaving the overshot unit connected to the stuck drill collars. This uncoupling or released condition is sometimes necessary where the formation around the well bore is difficult to ream because of the characteristics of the formation, or when it becomes necessary to add additional sections of operating drill pipe so that the reaming operation may continue. In another instance the teeth on the reaming shoe may become dull and it is necessary to replace the reaming shoe on the wash pipe. This releasing operation during the reaming procedure such as shown in Fig. 9 is permitted by raising the wash pipe 72 until the slips 21 are moved radially outwardly by contact with the mandrel 14 into an engaging position with the inner periphery of the wash pipe. Simultaneously, the lugs 63 are disposed above the bore or annulus 37 and in the upper portion of the swivel body 34 precluding a non-spreading thereof, such as is illustrated in Fig. 10. This position will bring the clutch teeth 64 and 65 into an interlocking position (Figs. 2 and 10). In this position the wash-over pipe 72 is then rotated in a right hand direction, such as shown by the arrows in Fig. 6, causing the left hand threads or wickers 29 of the member 28 to disengage from the wickers 67 of the locking dogs 63. The right hand rotation of the wash-over pipe and spear assembly will not cause an unthreading of any of the right hand joint of the upper operating drill string (not shown), but will permit disengagement of the swivel coupling body 28 and the coupling lugs 63. The fishing tool unit 1 is then in a position of release as shown in Fig. 11.

In order to re-engage the spear unit 2 with the overshot unit, it is only necessary to lower the wash-over pipe 72 back to its original lowest position, bringing the casing spear unit 2 and wickers 29 back into engagement with the wickers 67 on the overshot holding lugs 63. As shown in Fig. 11 in a position of release, the lugs 63 are maintained upwardly of the larger bore 37 by the spring 70 and in this position the outer spring ring 66 maintains an inner diameter for the lugs 63 that is smaller than the outer diameter of the wicker end 29 of the extension member 28, so that upon moving the spear unit 2 downwardly with the wash pipe 72, and positioning the end of the reduced portion 28 of the swivel coupling body 24 into engagement with the top of the lugs 63 there is caused a downward movement of the complete coupling lug body 58, thereby positioning the lugs 63 in the larger bore 37, which will permit spreading of the lugs so that a straight, downward, and non-rotative movement of the wickers 29 will re-connect the wickers 67 for re-engaging the spear assembly unit 2 with the overshot unit 3. It will thus be seen that no right or left hand rotation is necessary to recouple units 2 and 3 and that the downward disposition of the coupling lugs 63 permit them to spread outwardly against the spring ring 66 to permit the coupling operation.

Figure 16:
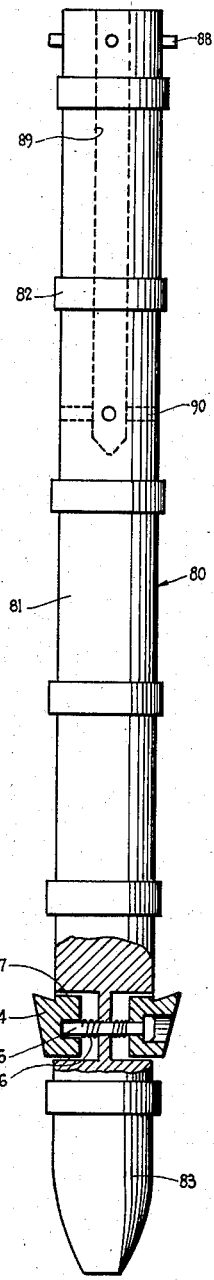
Figure 16 is a detail view in elevation of the special emergency releasing plug.

In Figs. 12, 13 and 14 is shown a modification of the releasing operation where an emergency releasing means is utilized in cases where the wash-over pipe 72 becomes stuck and cannot be rotated, or moved in any manner during the reaming operation. In order to disengage, or release the spear unit 2 from the overshot unit 3, an emergency plug is utilized for uncoupling the wickers 29 and 67. The operating string (not shown) for the wash-over pipe is usually connected to the rotary table at the surface of the well and the elongated plug 80 is inserted at the well surface into the fluid passage hole into the operating string where it travels downwardly into engagement with the coupling lugs 63. The emergency plug 80 as shown in elevation in Fig. 16 comprises a cylindrical shaped body member 81 having a plurality of vertically spaced circular packing rings 82 disposed on the outer periphery of the body. The bottom portion of the plug is provided with a tapered nose section 83 to facilitate passage through the operating string. Immediately above the nose section, the plug is provided with spring urged latch members 84 depending slightly outwardly from the outer periphery of the body 81.

The latches 84 are connected by a bolt member 85 having spaced helical springs 86 operating against the back face thereof to normally urge the latches radially outward. Limitation of the outward movement is provided by shoulders 87 on each of the latches 84. The upper portion of the plug is provided with a plurality of outwardly depending shear pins 88 for a purpose as will be hereinafter set forth. A vertical bore 89 communicating with transverse outlets 90 are provided in the upper portion of the plug and act as fluid circulation means for a purpose as will be hereinafter set forth.

When it is necessary to release by the emergency plug 80, it is dropped into the operating string until it enters into the bore 27 of the swivel coupling extension 28 after which circulating fluid pressure is directed from the surface of the well forcing the plug 80 downward in the bore 27 and into engagement with the shoulder 68 of the releasing lugs 63. This is necessary because the spring assembly ring 66 is of sufficient resistance to preclude expansion of the lugs 63, and consequently additional force is necessary to cause expansion of the lugs by the plug 80 moving therethrough. As the lugs 63 are expanded, the swivel coupling extension body 28 and the wickers 29 may be disconnected from the wickers 67 of the lugs 63 providing for the release desired. The shear pins 88 hold the plug 80 in the member 28 while the released casing spear unit 2 is being withdrawn. However, as the plug 80 is moved upwardly, the latches 84 are brought into contact with grooves 93 provided in the overshot lug retaining body 58, permitting the spring urged latches 84 to catch in the grooves and preclude further upward vertical movement of the plug 80. Continued upward movement of the spear unit will shear the pins 88 so that the emergency plug 80 may be moved downwardly into an inoperative position below the overshot unit 3 as shown in Fig. 14. This is provided for upon a renewal of the fluid circulation and when it is desired to recouple the spear unit 2 with the overshot unit 3.

While the spear unit 2 and the member 28 are being withdrawn from the overshot unit 3, fluid circulation can be maintained through the circulating holes 89 and 90. After release of the spear unit, the stuck or nonrotating wash pipe may be pulled or jarred upwardly for removal from the well bore. When it is desired to recouple the unit, it is only necessary to lower the wash over pipe with the spear unit disposed therein and recouple or re-engage the spear unit and overshot unit as heretofore set forth.

In Fig. 15 is disclosed a release operation that is sometimes necessary in order to move the wash over pipe 72 vertically in the well bore without interference by the slips 21 in any manner. As shown in Fig. 15, an upper operating drill stem 94 is connected with the threaded box 6 of the spear head 5 whereupon a right hand rotation by the operating drill stem manually or otherwise at the surface will cause the tubular screw body 8 to be threaded downwardly in the slip mandrel 14. This downward movement is controlled by the lower face of the lock nut 9 cooperating with the spear head 5 contacting the upper face 11 of the mandrel 14. During this operation, the mandrel is held non-rotative with the wash pipe by the non-friction dogs 12 permitting the downwardly threading operation. The shoulder 15 on the tubular body 8 limits upward movement of the slip control body 16 so that the slips 21 cannot come in contact with the tapered portion of the mandrel 14 and move into engagement with the inner periphery of the wash pipe 72. In this arrangement the spear assembly unit 2 may be raised with the wash over pipe to any position the operator desires without engaging or holding interference by the slips 21. To re-set the wash over pipe and spear so that the slips will again become operative, the upper operating drill stem 94 is held non-rotative by any suitable means, such as tongs or the like at the surface, and the wash over pipe is then rotated in a right hand rotation by the rotary table or manual means. This rotation of the wash over pipe causes the slip mandrel 14 through engagement with the upper dogs 12 to be threaded downward until it engages the top of the shoulder 15 on the body 8 thereby permitting a positioning of the slips with the tapered surface of the mandrel for engaging the wash over pipe when desired.

Throughout the specification the coupling and uncoupling apparatus has been called an overshot unit 3. However, it will be apparent that the coupling body 58 carrying the lugs 63 are comparable to overshot slips arranged in an inverted or upside down position and as such, the unit 3 could be properly defined as an undershot, if so desired.

From the foregoing, it will be apparent that the present invention contemplates a fishing tool apparatus for retrieving stuck drill collars and the like that are lodged in key-seated portions of a well bore wherein the apparatus may be combined with a wash-over apparatus for reaming the key-seated bore, the fishing tool apparatus is engaged with the drill collar prior to reaming, and substantially instantaneous with the dislodging of the stuck drill collars, is automatically engaged with the wash over pipe to hold the loosened drill collars and prevent falling thereof to the bottom of the well bore. In this manner, the loosened drill collars are in condition to be removed from the well bore. The fishing tool apparatus is engageable with the lodged drill collars prior to any initial reaming operation around the stuck portion of the drill collars, thereby avoiding any premature and detrimental loosening prior to any positive engagement with the fishing tool apparatus. In addition, the invention contemplates a fishing tool apparatus that simplifies connection and disconnection between parts engaging the stuck drill collar and the parts adapted to be engageable with the wash over pipe in order to facilitate release of the wash over pipe for any reason during any stage of the reaming operation, yet permitting re-connection of the operating parts in a simple and expeditious manner.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body precluding downward movement of the wash over pipe below the jointing tool body prior to an engagement of the jointing tool body with the drill collar, means provided in the overshot body releasably connecting the spear unit with the overshot body, said means comprising a swivel member adapted to be slidably disposed in the overshot body, a plurality of wickered lug members carried by the swivel member, a plurality of wickered teeth provided on the spear unit and adapted to be engaged with the wickered lug members for connecting the spear unit with the overshot body and limiting the slidable movement of the swivel member in the overshot body, means on the overshot body maintaining the wickered connection of the spear unit and overshot body during a reaming action of the wash-over pipe around the collar, and increased recess means provided in the overshot body for permitting disconnection of the wicker means between the swivel body and the spear unit.

2. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body unit precluding downward movement of the wash-over pipe below the jointing tool body unit prior to an engagement of the jointing tool body unit with the drill collar, an elongated swivel member slidably disposed in the overshot body, said swivel member having a plurality of wickered lug members carried thereby, a plurality of wickered teeth provided on the spear unit and engageable with the wickered lugs for connecting the spear unit with the overshot body and limiting the slideable movement of the swivel member in the overshot body, clutch teeth provided on the swivel member adapted to cooperate with clutch teeth on the overshot body to cause rotation of the swivel body simultaneously with the rotation of the wash-over pipe, means provided in the overshot body for maintaining the wickered connection between the spear and overshot units during a reaming action of the wash over pipe around the lodged collar.

3. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body unit precluding downward movement of the wash over pipe past the jointing tool body unit prior to an engagement of the jointing tool body unit with the drill collar, an elongated swivel member slidably disposed in the overshot body, said member having a plurality of wickered lug members carried thereby, a plurality of wickered teeth provided on the spear unit and engageable with the wickered lugs for connecting the spear unit with the overshot body and limiting the slidable movement of the swivel member in the overshot body, clutch teeth provided on the swivel member adapted to cooperate with clutch teeth on the overshot body to cause rotation of the swivel body simultaneously with the rotation of the wash-over pipe, means provided in the overshot body for maintaining the wickered connection between the spear and overshot units during a reaming action of the wash pipe around the lodged collar, and spring means cooperating with the swivel member to maintain the wickered connection.

4. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body unit precluding downward movement of the wash over pipe past the jointing tool body prior to an engagement of the jointing tool body unit with the drill collar, an elongated swivel member slidably disposed in the overshot body, said member having a plurality of wickered lug members carried thereby, a plurality of wickered teeth provided on the spear unit and engageable with the wickered lugs for connecting the spear unit with the overshot body and limiting the slidable movement of the swivel member in the overshot body, clutch teeth provided on the swivel member adapted to cooperate with clutch teeth on the overshot body to cause rotation of the swivel body simultaneously with the rotation of the wash-over pipe, means provided in the overshot body for maintaining the wickered connection between the spear and overshot units during a reaming action of the wash pipe around the lodged collar, spring means cooperating with the swivel member to maintain the wickered connection, and recess means provided in the overshot body for permitting disposition of the swivel member therein against the action of the spring means permitting movement of the wickered lugs and disconnection of the wickered spear therefrom.

5. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body unit precluding downward movement of the wash over pipe past the jointing tool body unit prior to an engagement of the jointing tool body unit with the drill collar, means releasably connecting the spear unit with the overshot body, said means comprising a swivel member slidably disposed in the overshot body, a plurality of wickered lug members pivotally carried by the swivel member, a plurality of wickered teeth provided on the spear unit and adapted to be engaged with the wickered lugs for connecting the spear unit with the overshot body and limiting the slidable movement of the swivel member in the overshot body, said lugs responsive to one position of the swivel member to maintain the wickered connection, and responsive to another position of the swivel member to permit release of the wickered spear therefrom.

6. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body precluding downward movement of the wash over pipe past the jointing tool body unit prior to an engagement of the jointing tool body unit with the drill collar, means releasably connecting the spear unit with the overshot body, said means comprising a swivel member slidably disposed in the overshot body, a plurality of wickered lug members pivotally carried by the swivel member, a plurality of wickered teeth provided on the spear unit and adapted to be engaged with the wickered lugs for connecting the spear unit with the overshot body and limiting the slidable movement of the swivel member in the overshot body, said lugs responsive to one position of the swivel member to maintain the wickered connection, and responsive to another position of the swivel member to permit release of the wickered spear therefrom, said wickered spear upon release adapted to be re-engaged with the wickered lugs of the swivel member by a downward thrust thereagainst in order to position the swivel member in the overshot body permitting spreading of the lug members and re-engagement with the wickered teeth of the spear body.

7. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, an elongated swivel member slidably disposed in the overshot body, said member having a plurality of wickered lug members carried thereby, a plurality of wickered teeth provided on the spear unit and engageable with the wickered lugs for connecting the spear unit with the overshot body and limiting the slidable movement of the swivel member in the overshot body, clutch teeth provided on the swivel member adapted to cooperate with clutch teeth on the overshot body to cause rotation of the swivel body simultaneously with the rotation of the wash-over pipe, means provided in the overshot body for maintaining the wickered connection between the spear unit and overshot body during a reaming action of the wash pipe around the lodged collar.

8. In a fishing apparatus for retrieving lodged drill collars from a well bore comprising in combination a wash-over reamer pipe adapted to be telescoped over the collars, and a fishing tool adapted to be supported in the wash-over pipe, means carried by the fishing tool for engagement with the wash over pipe for supporting said tool therein, said fishing tool comprising a spear unit, an overshot body and a jointing tool body unit, means carried by the jointing tool body unit providing for engagement with a lodged drill collar upon downward movement and rotation of the wash-over pipe in one direction in the bore, means releasably connecting the spear unit with the overshot body, said means comprising a swivel member slidably disposesd in the overshot body, a plurality of wickered lug members pivotally carried by the swivel member, a plurality of wickered teeth provided on the spear unit and adapted to be engaged with the wickered lugs for connecting the spear unit with the overshot body and limiting the slidable movement of the swivel member in the overshot body, said lugs responsive to one position of the swivel member to maintain the wickered connection, and responsive to another position of the swivel member to permit release of the wickered spear therefrom.

9. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, slip means carried by the spear unit and engageable with the wash-over pipe, a swivel member slidably disposed in the overshot body having a plurality of wickered lug members pivotally carried thereby, said lug members cooperating with a plurality of wickered teeth on the spear unit providing a releasable connection between the spear unit and the overshot body and limiting the slidable movement of the swivel member in the overshot body, means on the jointing tool body unit providing engagement of the fishing tool with the lodged drill collar, said slip means responsive to continued downward movement of the wash-over pipe after engagement of the fishing tool and collar for disengagement with the wash-over pipe, said disengaged slip means responsive to a loosening of the lodged drill collar by the wash-over reamer pipe for re-engagement with the pipe substantially simultaneous with the loosening of the collar.

10. In a fishing and reaming apparatus for retrieving lodged drill collars from a well bore, comprising in combination a wash-over pipe string having a reaming cutter carried at one end and a fishing tool supported in the wash-over string, said fishing tool comprising a spear unit, an overshot body and a jointing tool body unit, means carried by the jointing tool body unit for connecting the fishing tool with the lodged collars in the bore, slip means carried by the spear unit for engaging the wash-over pipe prior to connection of the tool with the collars, said slip means disengageable from the wash-over pipe after connection of the fishing tool and the collars, means carried by the jointing tool body unit for releasing the collar connecting portion thereof from the slip carrying portion by a vertical movement of the wash-over pipe.

11. In a fishing and reaming apparatus for retrieving lodged drill collars from a well bore, comprising in combination a wash-over pipe string having a reaming cutter carried at one end and a fishing tool supported in the wash-over string, said fishing tool comprising a spear unit, an overshot body and a jointing tool body unit, means carried by the jointing tool body unit for connecting the fishing tool with the lodged collars in the bore, slip means carried by the spear unit for engaging the wash-over pipe prior to connection of the jointing tool body unit with the collars, said slip means disengageable from the wash over pipe after connection of the fishing tool and the collars, means carried by the jointing tool body unit for alternately releasing and re-engaging the collar connecting portion from the slip carrying portion thereof by a reciprocable movement of the wash-over pipe in the bore.

12. In a fishing and reaming apparatus for retrieving lodged drill collars from a well bore, comprising in combination a wash-over pipe string having a reaming cutter carried at one end and a fishing tool supported in the wash-over string, said fishing tool comprising a spear unit, an overshot body and a jointing tool body unit, means carried by the jointing tool body unit for connecting the fishing tool with the lodged collars in the bore, slip means carried by the spear unit for engaging the wash over pipe prior to connection of the jointing tool body unit with the collars, said slip means disengageable from the wash over pipe after connection of the fishing tool and the collars, means carried by the jointing tool body unit for alternately releasing and re-engaging the collar connecting portion from the slip carrying portion thereof by a reciprocable movement of the wash over pipe in the bore, said slip means re-engageable with the wash over pipe substantially instantaneous with a loosening of the lodged drill collar by the reaming cutter.

13. In a combined fishing and reaming apparatus for retrieving stuck drill collars from a well bore comprising a wash over pipe disposed in the bore and adapted for telescoping movement over the stuck collars, a reaming shoe carried by the lower end of the wash over pipe, a fishing tool apparatus comprising a spear unit, an overshot unit and a jointing unit disposed in the wash over pipe in assembled relation, slip means carried by the spear unit for biting engagement with the wash over pipe, and means carried by the jointing unit for engagement with the stuck collars, said slip means disengaged from the wash over pipe by a continued downward movement of the wash over pipe after engagement of the jointing tool, a swivel coupling body carried by the overshot unit providing a connection with the spear unit, and means adapted to be inserted in the swivel body to release the spear unit from the overshot unit, said releasing means discharged from the swivel body upon a re-engagement of the spear unit with the overshot unit.

14. In a fishing apparatus for retrieving lodged drill collars from a well bore comprising in combination a wash-over reamer pipe adapted to be telescoped over the collars, and a fishing tool adapted to be supported in the wash-over pipe, said fishing tool comprising a spear unit, an overshot body and a jointing tool body unit, means carried by the jointing tool body unit providing for engagement with a lodged drill collar upon downward movement and rotation of the wash-over pipe in one direction in the bore, means carried by the jointing tool body unit precluding downward movement of the wash over pipe past the jointing tool body unit prior to an engagement of the jointing tool body unit with the drill collar, means releasably connecting the spear unit with the overshot body, said means comprising a swivel member slidably disposed in the overshot body, a plurality of wickered lug members pivotally carried by the swivel member, a plurality of wickered teeth provided on the spear unit and adapted to be engaged with the wickered lugs for connecting the spear unit with the overshot body and limiting the slidable movement of the swivel member in the overshot body, a drop plug insertable in the swivel member and engageable with the pivotal lug members to cause a spreading thereof and release of the wickered teeth of the spear unit therefrom.

References Cited in the file of this patent
UNITED STATES PATENTS

| | | |
|---|---|---|
| 1,521,596 | Casey | Jan. 6, 1925 |
| 2,179,033 | Cashion et al. | Nov. 7, 1939 |
| 2,449,841 | Claypool et al. | Sept. 21, 1948 |
| 2,577,605 | Clayton | Dec. 4, 1951 |
| 2,647,008 | Stewart et al. | July 28, 1953 |